US009706390B2

(12) United States Patent
Cho et al.

(10) Patent No.: US 9,706,390 B2
(45) Date of Patent: Jul. 11, 2017

(54) METHOD AND APPARATUS FOR UPDATING INFORMATION IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/655,661

(22) PCT Filed: Dec. 16, 2013

(86) PCT No.: PCT/KR2013/011674
§ 371 (c)(1),
(2) Date: Jun. 25, 2015

(87) PCT Pub. No.: WO2014/104633
PCT Pub. Date: Jul. 3, 2014

(65) Prior Publication Data
US 2015/0350961 A1    Dec. 3, 2015

Related U.S. Application Data

(60) Provisional application No. 61/760,662, filed on Feb. 5, 2013, provisional application No. 61/745,815, filed on Dec. 26, 2012.

(51) Int. Cl.
*H04Q 7/10* (2006.01)
*H04W 8/08* (2009.01)
(Continued)

(52) U.S. Cl.
CPC ......... *H04W 8/08* (2013.01); *H04W 36/0016* (2013.01); *H04W 36/0022* (2013.01);
(Continued)

(58) Field of Classification Search
CPC ... H04W 60/04; H04W 64/003; H04W 24/10; H04W 8/205; H04W 8/245
(Continued)

(56) References Cited

U.S. PATENT DOCUMENTS 8,611,946 B2 * 12/2013 Cormier ................ H04W 8/205
455/450
8,817,623 B2 * 8/2014 Gupta ................... H04W 4/005
370/235

(Continued)

FOREIGN PATENT DOCUMENTS

| WO | WO 2010/068154 A1 | 6/2010 |
| WO | WO 2012/047003 A2 | 4/2012 |
| WO | WO 2012/053844 A2 | 4/2012 |

OTHER PUBLICATIONS

Motorola, "X2 Setup Between Macro eNB and HeNB-GW," 3GPP TSG RAN WG3 #69bis meeting, R3-102597, Xi'an, P.R. China, Oct. 11-15, 2010, 3 pages.
(Continued)

*Primary Examiner* — Ajit Patel
*Assistant Examiner* — Julio Perez
(74) *Attorney, Agent, or Firm* — Birch, Stewart, Kolasch & Birch, LLP

(57) ABSTRACT

A method and apparatus for updating information on a cellular system in a wireless communication system is provided. An access point (AP) transmits a request for information on a cellular system and an update configuration for the information on the cellular system to a multi-radio access technology (RAT) device supporting a plurality of RATs, receives a first response to the request, which includes the information on the cellular system, from the multi-RAT device, and receives a second response, which is an update of the first response, according to the update configuration from the multi-RAT device.

9 Claims, 12 Drawing Sheets

(51) Int. Cl.
*H04W 36/00* (2009.01)
*H04W 36/16* (2009.01)
*H04W 48/14* (2009.01)
*H04W 88/06* (2009.01)

(52) U.S. Cl.
CPC ......... *H04W 36/165* (2013.01); *H04W 48/14* (2013.01); *H04W 88/06* (2013.01)

(58) Field of Classification Search
USPC ......... 455/435, 435.1, 443, 436, 450, 552.1, 455/550.1, 553.1; 370/328–39, 334–338
See application file for complete search history.

(56) References Cited

U.S. PATENT DOCUMENTS

| | | | |
|---|---|---|---|
| 2008/0285520 A1* | 11/2008 | Forte | H04W 36/0011 370/331 |
| 2010/0111053 A1* | 5/2010 | Avital | H04W 48/16 370/338 |
| 2010/0290389 A1 | 11/2010 | Hou et al. | |
| 2011/0002292 A1* | 1/2011 | Wang | H04W 60/04 370/329 |
| 2011/0117924 A1* | 5/2011 | Brunner | G01S 5/0252 455/456.1 |
| 2011/0312364 A1 | 12/2011 | Kim et al. | |
| 2012/0157096 A1* | 6/2012 | Baek | H04B 17/318 455/434 |
| 2012/0282922 A1 | 11/2012 | Fodor et al. | |
| 2013/0163424 A1* | 6/2013 | Goerke | H04W 24/02 370/235 |
| 2013/0201956 A1 | 8/2013 | Cho et al. | |
| 2014/0023059 A1* | 1/2014 | Gupta | H04W 36/34 370/338 |
| 2014/0155072 A1* | 6/2014 | Hellmann | H04W 36/32 455/440 |

OTHER PUBLICATIONS

Copending U.S. Appl. No. 14/655,042, filed Jun. 23, 2015.

* cited by examiner

Fig. 4

| Frame control | Persistent /ID | Address 1 | Address 2 | Address 3 | Sequence control | Address 4 | Sequence control | QoS control | HT control | Frame body | FCS |

METHOD AND APPARATUS FOR UPDATING INFORMATION IN WIRELESS COMMUNICATION SYSTEM

CROSS REFERENCE TO RELATED APPLICATIONS

This application is the National Phase of PCT International Application No. PCT/KR2013/011674, filed on Dec. 16, 2013, which claims priority under 35 U.S.C. 119(e) to U.S. Provisional Application Nos. 61/745,815, filed on Dec. 26, 2012 and 61/760,662, filed on Feb. 5, 2013, all of which are hereby expressly incorporated by reference into the present application.

TECHNICAL FIELD

The present invention relates to wireless communications, and more specifically, to a method and apparatus for updating information in a wireless communication system.

BACKGROUND ART

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless LAN (WLAN) system. The cellular system may be one of a $3^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In a fifth-generation mobile communication system constituted of a plurality of RATs, a primary RAT system needs to grasp the entities of a secondary RAT system that operates within its own coverage. For example, in case that a primary RAT system is a cellular system, and a secondary RAT system is a Wi-Fi system, a cellular node such as an eNodeB (eNB), mobility management entity (MME), or new cellular entity need be aware of which access points (APs) are in operation within its coverage. An entity of a secondary RAT system may report information on the entity of the second RAT system to a management device (for example, a management server). An AP information management entity in the cellular system, e.g., eNB, MME, or new entity, may acquire information on APs within an area, which is managed by AP information management entity, from a separate management server. For example, if the AP information management entity is the eNB, the eNB may acquire information on APs within its coverage.

According to a situation, there is need for method for updating, by an AP, information on a cellular system using a general device. Also, there is a need for a method for updating, by an AP information management entity in the cellular network, information on APs.

SUMMARY OF INVENTION

Technical Problem

The present invention provides a method and apparatus for updating information in a wireless communication system. The present invention provides a method for updating, by an access point (AP), information on a cellular system using a general device. The present invention provides a method for updating, by an AP information management entity of the cellular system, information on APs from an AP information management server which is located within the cellular system.

Solution to Problem

In an aspect, a method for updating, by an access point (AP), information on a cellular system in a wireless communication system is provided. The method includes transmitting a request for information on a cellular system and an update configuration for the information on the cellular system to a multi-radio access technology (RAT) device supporting a plurality of RATs, receiving a first response to the request, which includes the information on the cellular system, from the multi-RAT device, and receiving a second response, which is an update of the first response, according to the update configuration from the multi-RAT device.

The update configuration may be one of a periodic transmission or an event-triggered transmission.

If the update configuration is the event-triggered transmission, the second response may be received when the information on the information on the cellular system is changed, or when information on the multi-RAT device is changed, or when the multi-RAT device is changed.

The request may be transmitted through an advanced primary RAT system information request (ARSI-REQ) frame, and the first response and the second response may be received through an advanced primary RAT system information response (ARSI-RSP) frame.

The second response may include a result of the request, a reason for the result, and an output for the request according to an action code.

The output for the request may include at least one of an identity of the cellular system, an identity of a base station (BS) controller of the cellular system, an identity of a cell or BS of the cellular system, or location information of the multi-RAT device.

The method may further include transmitting updated information on the cellular system based on the second response to an AP information management device.

The AP information management device may be one of a generic advertisement service (GAS) server using an access network query protocol (ANQP) or a WLAN access gateway (WAG).

The updated information on the cellular system may further include at least one of an estimated location of the AP, a media access control (MAC) address of the AP, a service set identifier (SSID) of the AP, a homogeneous extended service set ID (HESSID) of the AP, whether of the AP can be used by a limited user, and information on a frequency channel used by the AP.

In another aspect, a method for transmitting, by a multi-radio access technology (RAT) device supporting a plurality of RATs, information on a cellular system in a wireless communication system is provided. The method includes receiving a request for information on a cellular system and an update configuration for the information on the cellular system from an access point (AP), transmitting a first response to the request, which includes the information on the cellular system, to the AP, and transmitting a second response, which is an update of the first response, according to the update configuration to the AP.

In another aspect, a method for transmitting, by an access point (AP) server, information on APs in a wireless communication system is provided. The method includes transmitting an update message including an update flag to an AP information management entity of a cellular system using a newly defined interface.

The AP information management device may be one of a generic advertisement service (GAS) server using an access network query protocol (ANQP) or a WLAN access gateway (WAG).

The AP information management entity of the cellular system may be one of an eNodeB (eNB), mobility management entity (MME) or new entity.

The update flag may indicate one of addition of information on new AP, modification of information on an AP which is previously transmitted, or deletion of information on the AP which is previously transmitted.

The update message may further include at least one of a media access control (MAC) address of an AP, a service set identifier (SSID) of the AP, a homogeneous extended service set ID (HESSID) of the AP, whether of the AP can be used by a limited user, information on a frequency channel used by the AP, and position of the AP.

Advantageous Effects of Invention

Information on a cellular system or information on APs can be updated efficiently.

BRIEF DESCRIPTION OF DRAWINGS

FIG. 4 shows an example of a frame structure of IEEE 802.11.

MODE FOR THE INVENTION

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
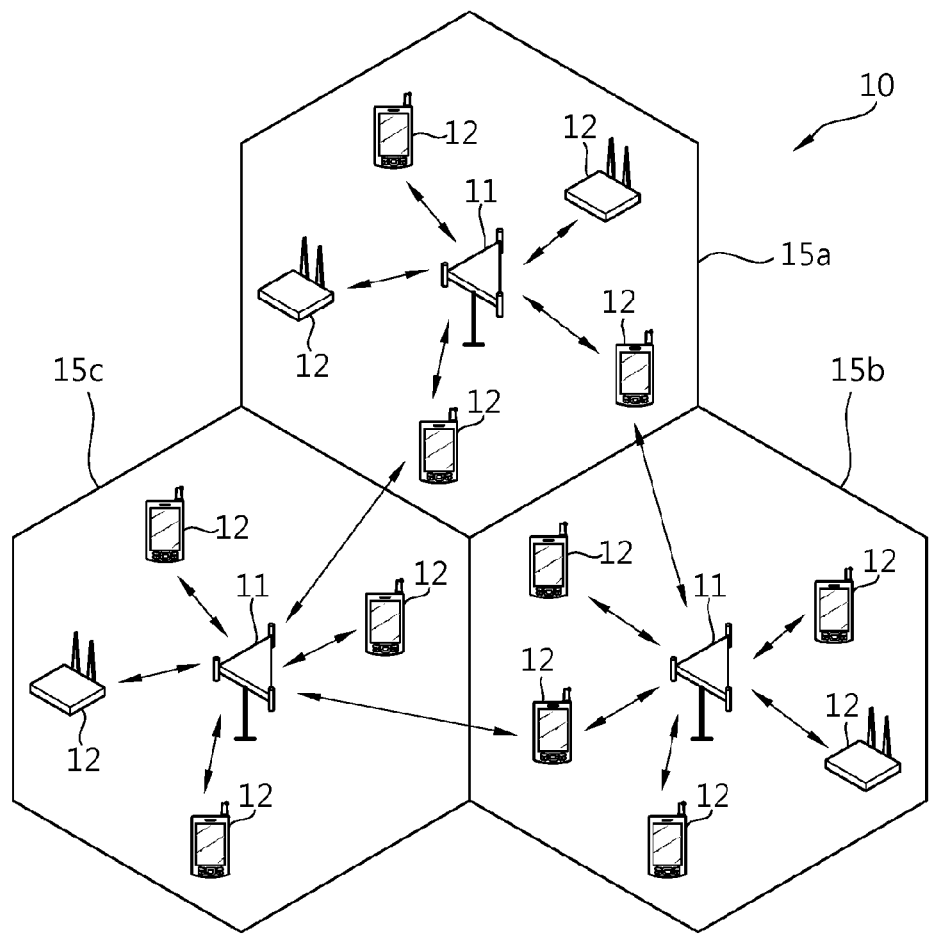
FIG. 1 shows a cellular system.

FIG. 1 shows a cellular system.
Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
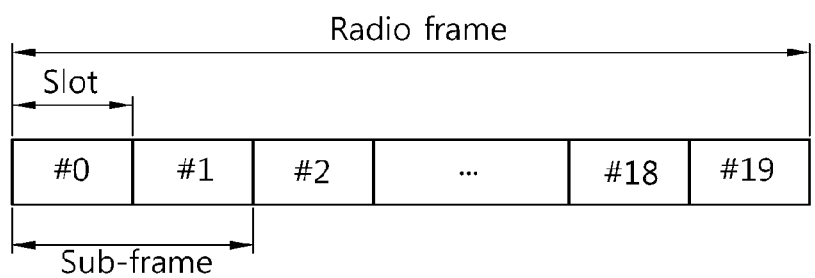
FIG. 2 shows a structure of a radio frame in 3GPP LTE.

FIG. 2 shows a structure of a radio frame in 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
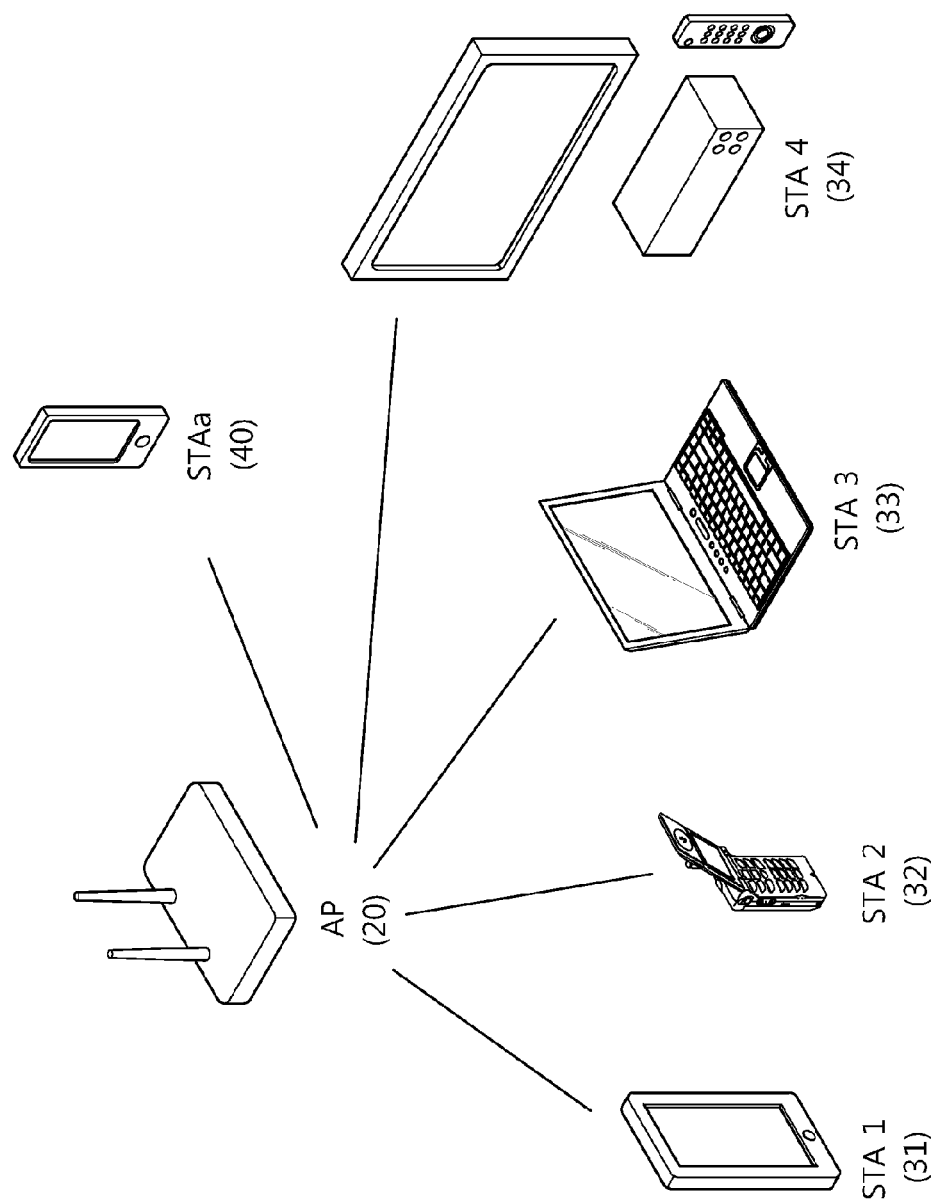
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

|  | Authentication | Association |
|---|---|---|
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
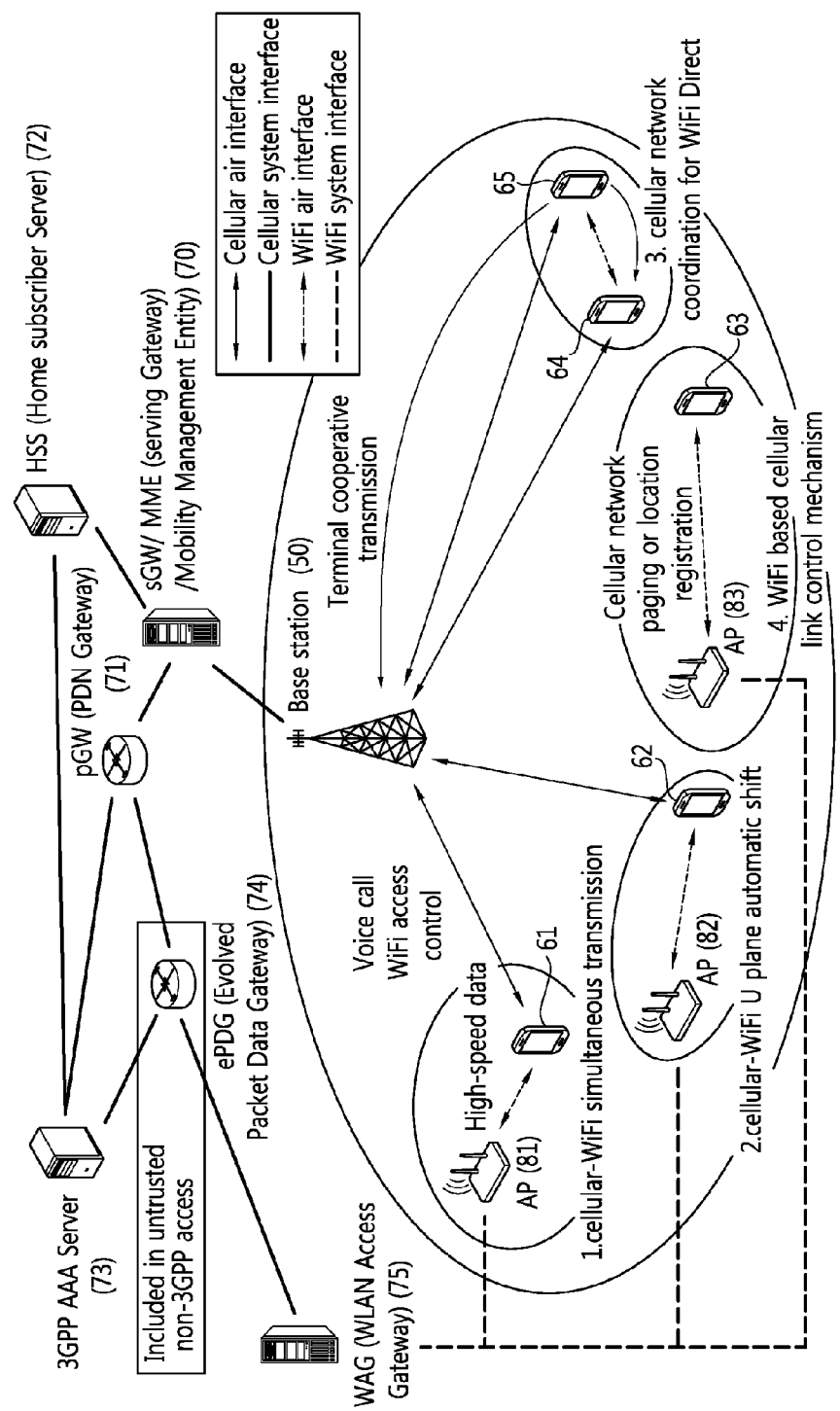
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (e-PDG) 74 through the cellular system interface. The e-PDG 74 may be included only in untrusted non-3GPP access. The e-PDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

A method for acquiring, by an AP information management entity of a primary RAT system, information on APs in a secondary RAT system from an AP information management server, which is located within the primary RAT system, according to embodiments of the present invention is described below. Hereinafter, for convenience of the description, it is assumed that the primary RAT system is a 3GPP LTE (or 3GPP LTE-A) which is a cellular system, and the secondary RAT system an IEEE 802.11 (Wi-Fi) which is a WLAN system. However, the embodiment of the present invention is not limited thereto. When the primary RAT system is a 3GPP LTE(-A), the AP information management entity of a primary RAT system may be one of an eNB, MME or new entity.

The AP information management server may be a device to provide a generic advertisement service (GAS) using an access network query protocol (ANQP). The ANQP is a query protocol for access network information retrieval transported by GAS public action frames. GAS provides functionality that enables STAs to discover the availability of information related to desired network services, e.g., information about services such as provided in an IBSS, local access services, available subscription service providers (SSPs) and/or subscription service provider networks (SSPNs) or other external networks. GAS uses a generic container to advertise network services' information over an IEEE 802.11 network. Public action frames are used to transport this information. Further, the AP information management server may be a WAG. A new entity may be added between the AP and the management server so that a corresponding entity may combine information on the cellular system transmitted from the AP, change a transmission format, and transmit the combined information to the management server. The added new entity may be a dual-stack gateway or an AP controller, etc. Or, in the description above, the AP information management server may be a device providing an access network discovery and selection function (ANDSF).

1) First, a scenario in which an eNB, which is an AP information management entity, acquires AP information from an AP information management server (Hereinafter, an AP server) through the MME is described.

Figure 6:
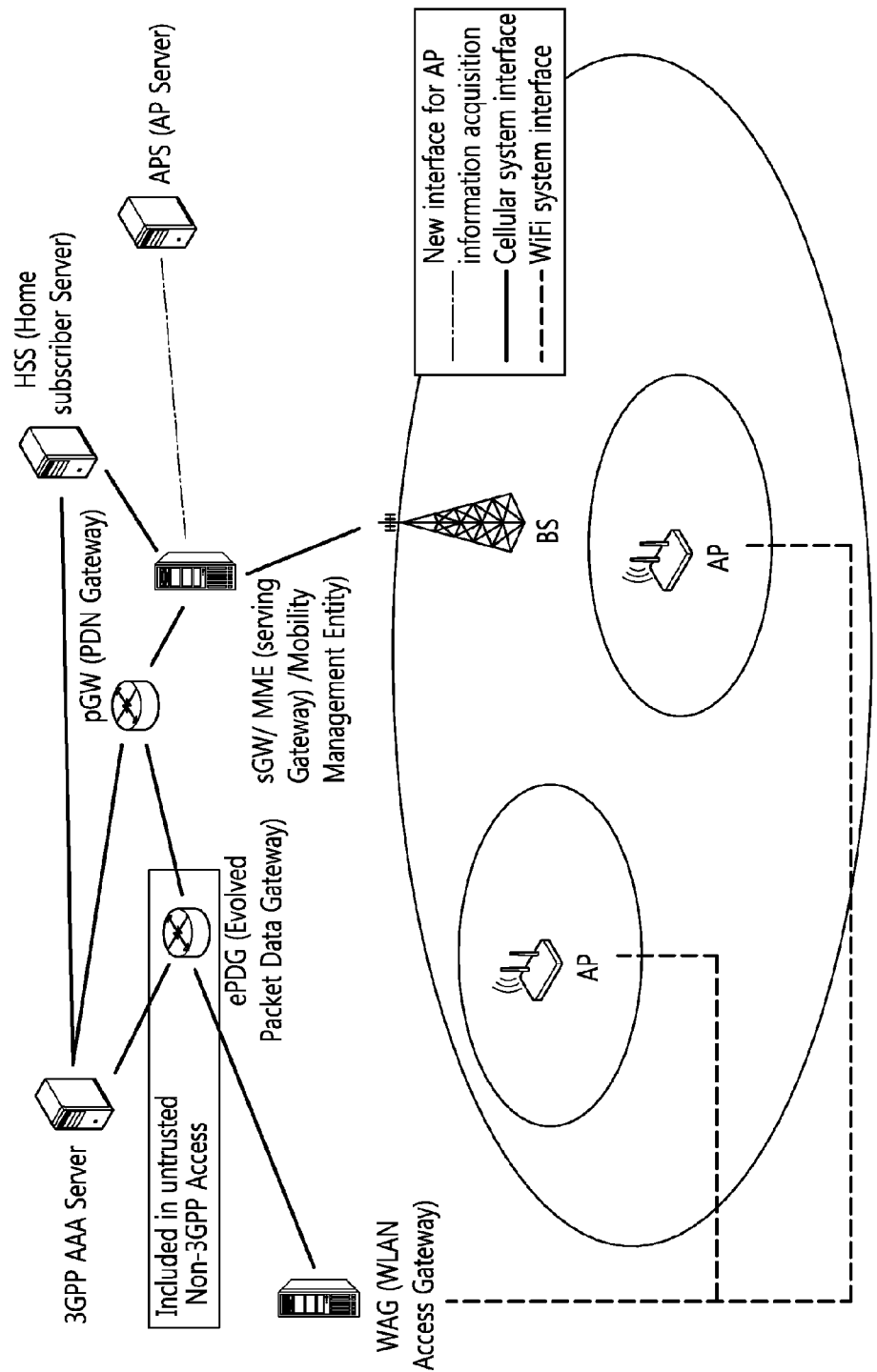
FIG. 6 shows an example of a structure of a system in which an eNB, which is an AP information management entity, may acquire AP information from an AP server according to an embodiment of the present invention.

FIG. 6 shows an example of a structure of a system in which an eNB, which is an AP information management entity, may acquire AP information from an AP server according to an embodiment of the present invention. Referring to FIG. 6, when a structure of a convergence system of a cellular system and a Wi-Fi system described in FIG. 5 is used, the AP server exists within the cellular system. The AP server may be connected to an S-GW/MME through a new cellular system interface for acquiring AP information. The eNB, which is an AP information management entity, may acquire AP information from the AP server through a new cellular system interface between the S-GW/MME and the AP server.

Figure 7:
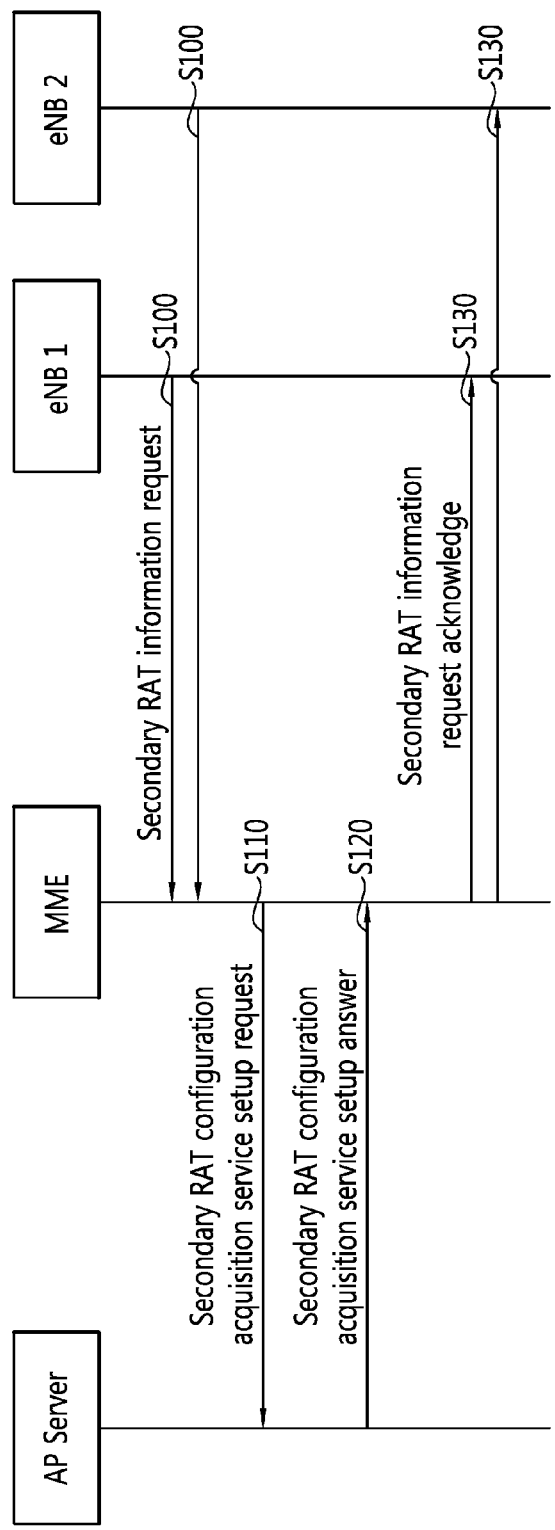
FIG. 7 shows an example of a method in which an eNB, which is an AP information management entity, acquires AP information from an AP server according to an embodiment of the present invention.

FIG. 7 shows an example of a method in which an eNB, which is an AP information management entity, acquires AP information from an AP server according to an embodiment of the present invention.

In step S100, in order for an eNB1/eNB2 to acquire information of an AP existing within coverage thereof, the eNB1/eNB2 transmits a secondary RAT information request to an MME. For example, the eNB may transmit a secondary RAT information request to the MME at a time point at which the eNB first turns on power or at a time point that determines that it is necessary to apply convergence of the cellular system and the Wi-Fi system to devices within coverage of the eNB. Because AP information is not UE specific information, the secondary RAT information request may be non-UE associated signaling.

When the eNB transmits the secondary RAT information request, an S1 application protocol, which is an existing cellular system interface, may be used. When the eNB and the MME perform an AP information request/response through an S1 interface, transmitted messages each are identified by a Message Type information element (IE). Table 2 represents an example of Message Type IE.

TABLE 2

| IE/Group Name | Presence | Range | IE type and reference | Semantics description |
| --- | --- | --- | --- | --- |
| Message Type | | | | Assumed max no of messages is 256. |
| >Procedure Code | M | | (Handover Preparation, Handover Resource Allocation, Handover Notification, Path Switch Request, Handover Cancellation, E-RAB Setup, E-RAB Modify, E-RAB Release, E-RAB Release Indication, Initial Context Setup, Paging, Downlink NAS transport, Initial UE Message, Uplink NAS transport, Reset, Error Indication, NAS Non Delivery Indication, S1 Setup, UE Context Release Request, UE Context Release, Downlink S1 CDMA2000 Tunneling, Uplink S1 CDMA2000 Tunneling; UE Context Modification, UE Capability Info Indication, eNB Status Transfer, MME Status Transfer, Deactivate Trace, Trace Start, Trace Failure Indication, eNB Configuration Update, MME Configuration Update, Location Reporting Control, Location Reporting Failure Indication, Location Report, Overload Start, Overload Stop, Private Message, Write-Replace Warning, eNB Direct Information Transfer, MME Direct Information Transfer, Cell Traffic Trace, eNB Configuration Transfer, MME Configuration Transfer, Downlink UE Associated LPPa transport, Uplink UE Associated LPPa transport, Downlink Non UE Associated LPPa transport, Uplink Non UE Associated LPPa transport, Kill, UE Radio Capability Match, . . .) | |
| >Type of Message | M | | CHOICE (Initiating Message, Successful Outcome, Unsuccessful Outcome, . . .) | |

Referring to Table 2, Message Type IE includes a Procedure Code field. The Procedure Code field may be an id-SecondaryRATInformationRequest. Accordingly, it may be seen that a corresponding message is a message related to AP information acquisition. Further, Message Type IE includes a Type of Message field. When the Procedure Code field is an id-SecondaryRATInformationRequest, the Type of Message field may be one of 'Initiating Message', 'Successful Outcome', and 'Unsuccessful Outcome'. For example, when the Type of Message field is an 'Initiating message', this is a secondary RAT information request in which the eNB transmits to the MME, and a corresponding message becomes a SecondaryRATInformationRequest message. Alternatively, when a Type of Message field is 'Successful Outcome', this is a response in which the MME transmits to the eNB when a request of the eNB is succeeded, and a corresponding message becomes a SecondaryRATInformationRequestAcknowledge message. This will be described later. Alternatively, when a Type of Message field is 'Unsuccessful Outcome', this is a response in which the MME transmits to the eNB when a request of the eNB is failed, and a corresponding message becomes a SecondaryRATInformationRequestFailure message. This will be described later. Further, criticality of the Message Type IE may be 'reject'. This is error handling when the MME cannot recognize or analyze a request of the eNB and represents that a reject procedure is performed.

Further, the secondary RAT information request may include a request range flag. When the request range flag is 'all', this represents that the eNB requests information of APs within managing entire cells. When the request range flag is 'specific cell(s)', this represents that the eNB requests information of an AP within a specific cell among managing cells. That is, the request range flag indicates a range in which the eNB requests AP information. Further, the secondary RAT information request may further include a cell ID. This may be physical cell ID according to an AP information request range.

In step S110, upon receiving the secondary RAT information request from the eNB, the MME transmits a secondary RAT configuration acquisition service setup request to the AP server and requests service registration for acquiring AP information. The MME may request only information of the AP corresponding to the eNB, which transmits the secondary RAT information request. Alternatively, the MME may request information of APs corresponding to all or a part of eNBs which the MME manages. For an eNB which does not transmit the secondary RAT information request, this may be terminated with onetime acquisition event.

In order for the MME to transmit a secondary RAT configuration acquisition service setup request to the AP server, a new cellular system interface may be defined between the MME and the AP server. Further, a Command-Code value for identifying the secondary RAT configuration acquisition service setup request transmitted through a new cellular system interface may be defined. The Command-Code value may be allocated by Internet assigned numbers authority (IANA) in Internet engineering task force (IETF) request for comments (RFC) 5516.

Further, the secondary RAT configuration acquisition service setup request may include identifier information of corresponding each eNB according to an AP information request range. The identifier information of each eNB may include each eNB ID, a request range flag of each eNB, cell ID of each eNB, public land mobile network (PLMN) ID, and a location and coverage of each eNB. A combination of PLMN ID, eNB ID, and cell ID may be a format of E-UTRAN cell ID (ECI) or E-UTRAN cell global ID (ECGI). Further, like PLMN ID, identifier information that is common to each eNB, may be included only one time within the secondary RAT configuration acquisition service setup request.

In step S120, upon receiving the secondary RAT configuration acquisition service setup request from the MME, the AP server transmits a secondary RAT configuration acquisition service setup answer to the MME. The secondary RAT configuration acquisition service setup answer may include AP information according to a request of the MME. The AP server may extract information of an AP within coverage of a minimum unit (e.g., a cell) of a request according to an AP information request range and include the information of the AP in the secondary RAT configuration acquisition service setup answer. Further, the secondary RAT configuration acquisition service setup answer may include a result code to the request of the MME, PLMN ID, eNB ID, cell ID, and a location and coverage of the eNB. The secondary RAT configuration acquisition service setup answer may be transmitted through a newly defined cellular system interface between the AP server and the MME. A Command-Code value for identifying the secondary RAT configuration acquisition service setup answer may be defined. The Command-Code value may be allocated by IANA in IETF RFC 5516.

AP information on a minimum unit of a request included in the secondary RAT configuration acquisition service setup answer may include a MAC address (BSSID) of the AP, SSID of the AP, information on whether the AP is an AP in which only a limited user can use (closed subscriber group (CSG) and password/open subscriber group (OSG), homogeneous ESS ID (HESSID) of the AP, information (operating class and channel number) about a frequency channel in which the AP uses, and a location of the AP.

The result code included in the secondary RAT configuration acquisition service setup answer may be set to one of 'success', 'failure 1', and 'failure 2'. A result code set to 'success' represents that a request of the MME was succeeded. A result code set to 'failure 1' represents that a request of the MME was failed. A result code set to 'failure 2' represents that a request of the MME may not be satisfied at a time point that receives a request of the MME, but may be satisfied later. When the result code is set to 'failure 2', the AP server may further include a time point that can respond to a request of the MME in the secondary RAT configuration acquisition service setup answer. Alternatively, the AP server may notify the MME that the AP server may respond at a time point that can respond to a request of the MME or may transmit corresponding AP information at a time point that can respond to a request of the MME.

In step S130, upon receiving the secondary RAT configuration acquisition service setup answer from the AP server, the MME transmits secondary RAT information request acknowledge or secondary RAT information request failure to each eNB. The MME receives the secondary RAT configuration acquisition service setup answer and determines a result code within the secondary RAT configuration acquisition service setup answer. When the result code is 'success', the MME transmits secondary RAT information request acknowledge including AP information on a minimum unit of a request corresponding to each eNB to the each eNB. When the result code is 'failure' (including failure 1 and failure 2), the MME transmits secondary RAT information request failure to corresponding each eNB. In FIG. 7, it is assumed that the result code is 'success'.

Secondary RAT information request acknowledge or secondary RAT information request failure may be transmitted using an S1 application protocol. Secondary RAT information request acknowledge may be transmitted through a SecondaryRATInformationRequestAcknowledge message in which a type of message field is 'Successful Outcome'. Secondary RAT information request failure may be transmitted through a SecondaryRATInformationRequestFailure message in which a Type of Message field is 'Unsuccessful Outcome'.

AP information included in the secondary RAT information request acknowledge may include a MAC address (BSSID) of the AP, SSID of the AP, information (CSG and password/OSG) on whether the AP is an AP in which only a limited user can use, HESSID of the AP, information (operating class, channel number) about a frequency channel in which the AP uses, and a location of the AP. Further, the secondary RAT information request acknowledge may include a cell ID. The secondary RAT information request acknowledge or the secondary RAT information request failure may include a result code of 'success', 'failure 1', or 'failure 2'. This may be identical to a result code in which the AP server transmits through the secondary RAT configuration acquisition service setup answer. When the result code of the secondary RAT information request failure is 'failure 2', the secondary RAT information request failure may further include a re-request time point.

Upon receiving the secondary RAT information request acknowledge from the MME, the eNB stores received AP information on a minimum unit of a request. Upon receiving the secondary RAT information request failure from the MME, the eNB determines a result code within the secondary RAT information request failure. When the result code is 'failure 1', the eNB no longer requests AP information. When the result code is 'failure 2', the eNB awaits until a re-request time point included in the secondary RAT information request failure. The eNB may request again AP information at a corresponding re-request time point later.

2) A scenario in which the eNB, which is an AP information management entity, directly acquires AP information from the AP server through a newly defined cellular system interface is described.

Figure 8:
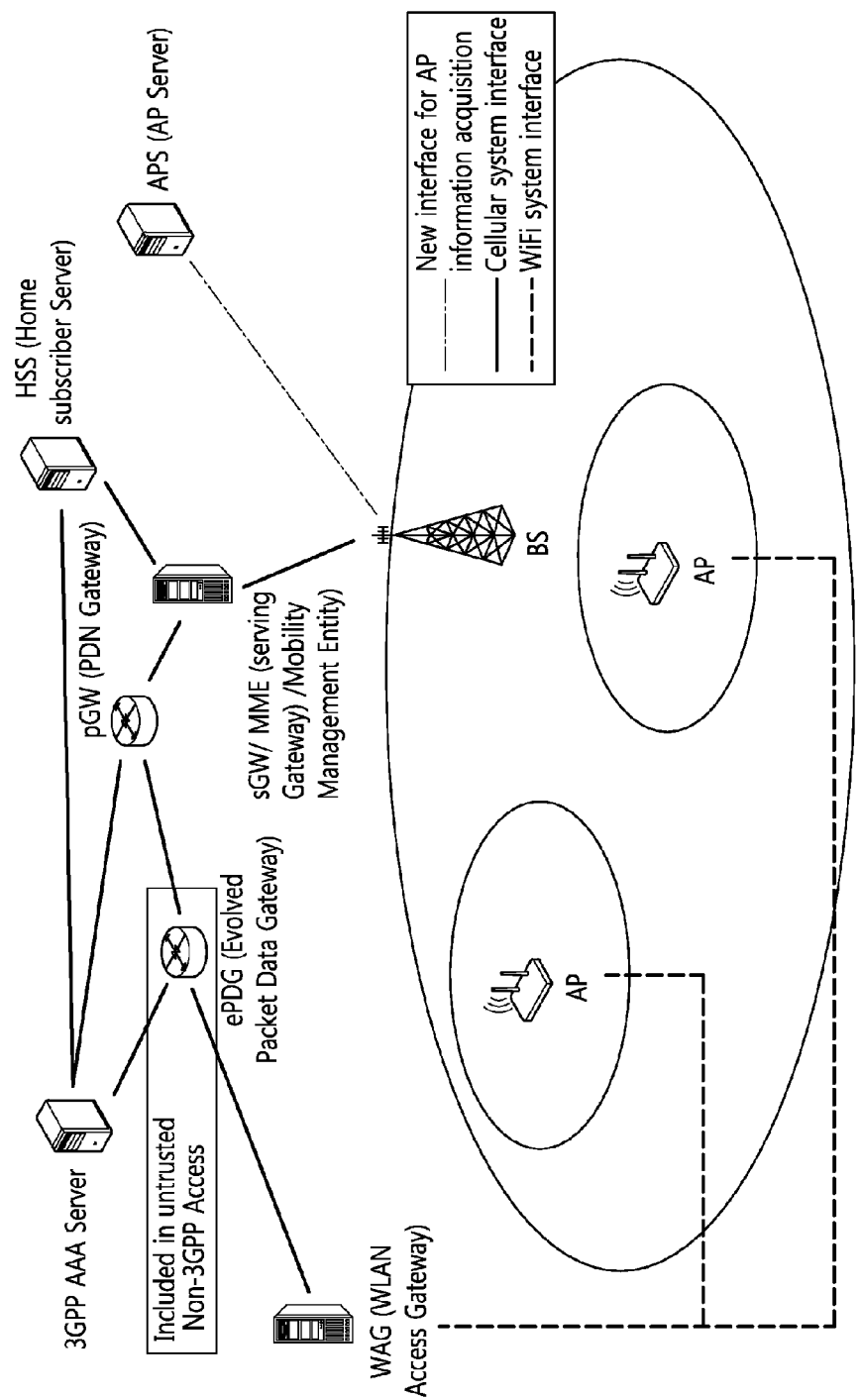
FIG. 8 shows an example of a structure of a system in which an eNB, which is an AP information management entity, may acquire AP information from an AP server according to another embodiment of the present invention.

FIG. 8 shows an example of a structure of a system in which an eNB, which is an AP information management entity, can acquire AP information from an AP server according to another embodiment of the present invention. Referring to FIG. 8, while a structure of a convergence system of a cellular system and a Wi-Fi system described in FIG. 5 is used, the AP server exists within the cellular system. The AP server may be connected to an eNB, which is an AP information management entity, through a new cellular system interface for acquiring AP information. The eNB, which is an AP information management entity, may directly acquire AP information from the AP server through a new cellular system interface with the AP server.

Figure 9:
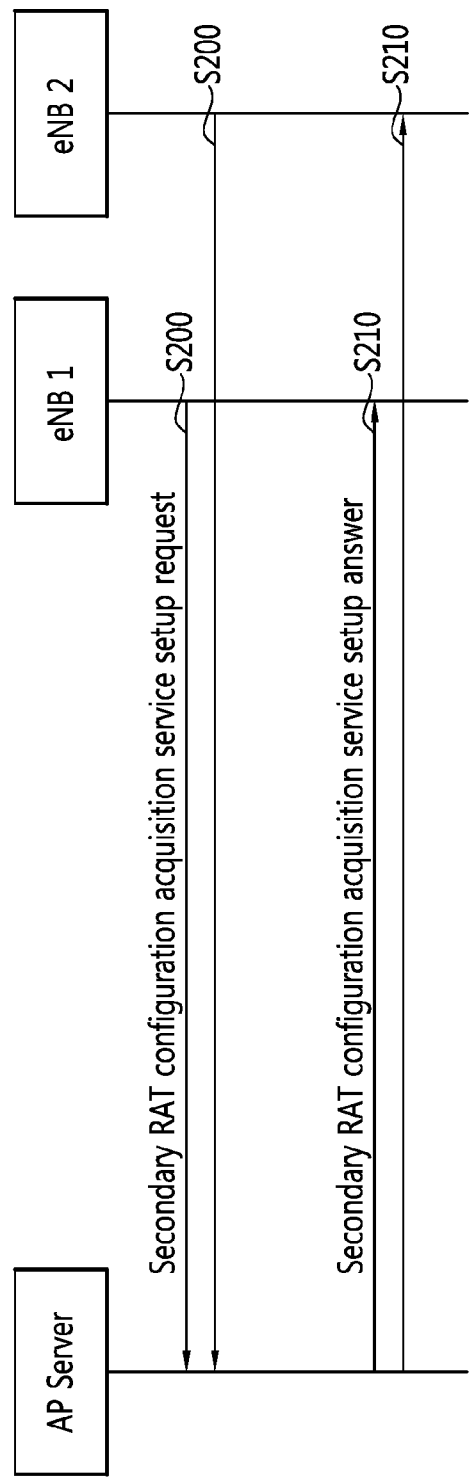
FIG. 9 shows an example of a method in which an eNB, which is an AP information management entity, acquires AP information from an AP server according to another embodiment of the present invention.

FIG. 9 shows an example of a method in which an eNB, which is an AP information management entity, acquires AP information from an AP server according to another embodiment of the present invention.

In step S200, in order for the eNB1/eNB2 to acquire information of an AP existing within coverage thereof, the eNB1/eNB2 transmits a secondary RAT configuration acquisition service setup request to the AP server. Accordingly, the eNB may request service registration to the AP server. For example, the eNB may transmit a secondary RAT configuration acquisition service setup request to the AP server at a time point at which the eNB first turns on power or at a time point that determines that it is necessary to apply convergence of a cellular system and a Wi-Fi system to devices within coverage of the eNB. Because AP information is not UE specific information, the secondary RAT configuration acquisition service setup request may be non-UE associated signaling.

In order for the eNB to transmit the secondary RAT configuration acquisition service setup request to the AP server, a new cellular system interface may be defined between the eNB and the AP server. Further, a Command-Code value for identifying the secondary RAT configuration acquisition service setup request transmitted through the new cellular system interface may be defined. The Command-Code value may be allocated by IANA in IETF RFC 5516.

Further, the secondary RAT configuration acquisition service setup request may include identifier information of the eNB according to an AP information request range. The identifier information of the eNB may include eNB ID, physical cell ID, and PLMN ID. A combination of PLMN ID, eNB ID, and cell ID may be a format of ECI or ECGI. Further, the secondary RAT configuration acquisition service setup request may additionally include a request range flag and a location and coverage of the eNB. When the request range flag is 'all', this represents that the eNB requests information of APs within managing entire cells. When the request range flag is 'specific cell(s)', this represents that the eNB requests information of an AP within a specific cell among managing cells.

In step S210, upon receiving the secondary RAT configuration acquisition service setup request from the eNB, the AP server transmits a secondary RAT configuration acquisition service setup answer to the eNB. The secondary RAT configuration acquisition service setup answer may include AP information according to a request of each eNB. The AP server may extract information of the AP within coverage of a minimum unit (e.g., a cell) of a request according to an AP information request range and include the information in the secondary RAT configuration acquisition service setup answer. Further, the secondary RAT configuration acquisition service setup answer may include a result code to the request of the eNB, PLMN ID, eNB ID, cell ID, and a location and coverage of the eNB. The secondary RAT configuration acquisition service setup answer may be transmitted through a newly defined cellular system interface between the AP server and the eNB. A Command-Code value for identifying the secondary RAT configuration acquisition service setup answer may be defined. The Command-Code value may be allocated by IANA in IETF RFC 5516.

AP information on a minimum unit of a request included in the secondary RAT configuration acquisition service setup answer may include a MAC address (BSSID) of the AP, SSID of the AP, information (CSG and password/OSG) on whether the AP is an AP in which only a limited user can use, HESSID of the AP, information operating class, channel number) about a frequency channel in which the AP uses, and a location of the AP.

The result code included in the secondary RAT configuration acquisition service setup answer may be set to any one of 'success', 'failure 1', and 'failure 2'. A result code set to 'success' represents that a request of the eNB was succeeded. A result code set to 'failure 1' represents that a request of the eNB was failed. A result code set to 'failure 2' represents that a request of the eNB may not be satisfied at a time point that receives a request of the eNB, but may be satisfied later. When the result code is set to 'failure 2', the AP server may further additionally include a time point that can respond to a request of the eNB in the secondary RAT configuration acquisition service setup answer. Alternatively, the AP server may notify the eNB that the AP server may respond at a time point that can respond to a request of the eNB or may transmit corresponding AP information at a time point that can respond to a request of the eNB.

Upon receiving the secondary RAT configuration acquisition service setup answer from the AP server, the eNB determines a result code within the secondary RAT configuration acquisition service setup answer. When the result code is 'success', the eNB stores AP information that receives on a minimum unit of a request. When the result code is 'failure 1', the eNB no longer requests AP information. When the result code is 'failure 2', the eNB awaits until a time point, in which the AP server can respond to a request of the eNB, included in the secondary RAT configuration acquisition service setup answer. The eNB may request again AP information at a time point at which the AP server can respond to a request of the eNB.

3) A scenario in which a MME or a new entity, which is an AP information management entity, acquires AP information from the AP server through a newly defined cellular system interface is described. The scenario may use the structure of the system described in FIG. 6. That is, the AP server exists within a cellular system, and the AP server may be connected to the MME or the new entity through a new cellular system interface for acquiring AP information. The MME or the new entity, which is an AP information management entity, may acquire AP information from the AP server through a new cellular system interface with the AP server.

Figure 10:
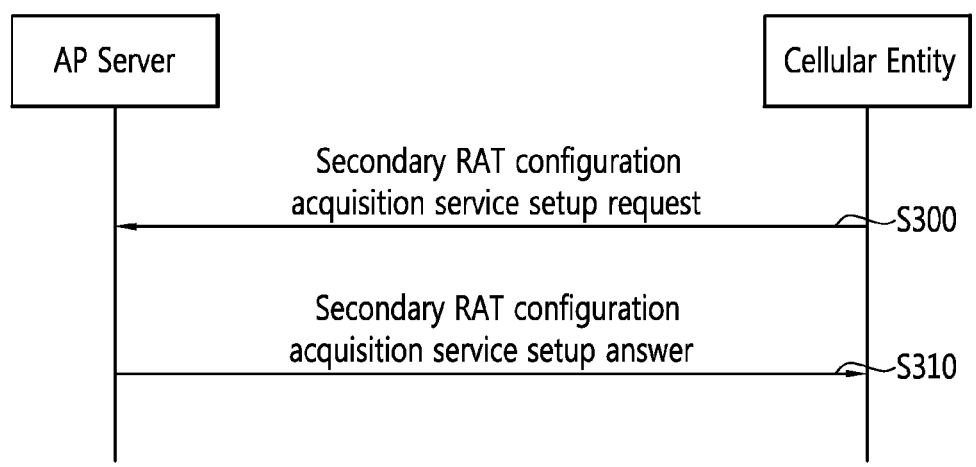
FIG. 10 shows an example of a method in which a cellular entity, which is an AP information management entity, acquires AP information from an AP server according to an embodiment of the present invention.

FIG. 10 shows an example of a method in which a cellular entity, which is an AP information management entity, acquires AP information from an AP server according to an embodiment of the present invention. The cellular entity may be the MME or the new entity.

In step S300, in order for the cellular entity to acquire information of AP existing within coverage of all or a part of eNBs which the cellular entity manages, the cellular entity transmits a secondary RAT configuration acquisition service setup request to the AP server. Accordingly, the cellular entity may request service registration to the AP server. For example, the cellular entity may transmit a secondary RAT configuration acquisition service setup request to the AP server at a time point at which the eNB first turns on power or at a time point that determines that it is necessary to apply convergence of the cellular system and the Wi-Fi system to devices within coverage of the eNB. Because AP information is not UE specific information, the secondary RAT configuration acquisition service setup request may be non-UE associated signaling.

In order for the cellular entity to transmit the secondary RAT configuration acquisition service setup request to the AP server, a new cellular system interface may be defined between the cellular entity and the AP server. Further, a Command-Code value for identifying the secondary RAT configuration acquisition service setup request transmitted through the new cellular system interface may be defined. The Command-Code value may be allocated by IANA in IETF RFC 5516.

Further, the secondary RAT configuration acquisition service setup request may include identifier information of each eNB according to an AP information request range. The identifier information of each eNB may include each eNB ID and cell ID and PLMN ID of each eNB. A combination of PLMN ID, eNB ID, and cell ID may be a format of ECI or ECGI. Further, the secondary RAT configuration acquisition service setup request may additionally include a request range flag of each eNB and a location and coverage of each eNB. When the request range flag is 'all', this represents that each eNB requests information of APs within a managing entire cell. When the request range flag is 'specific cell(s)', this represents that each eNB requests information of an AP within a specific cell among managing cells. Further, like PLMN ID, identifier information that is common to each eNB may be included only one time within the secondary RAT configuration acquisition service setup request.

In step S310, upon receiving the secondary RAT configuration acquisition service setup request from the cellular entity, the AP server transmits the secondary RAT configuration acquisition service setup answer to the cellular entity. The secondary RAT configuration acquisition service setup answer may include AP information according to a request of the cellular entity. The AP server may extract information of an AP within coverage of a minimum unit (e.g., a cell) of a request according to an AP information request range and include the information in the secondary RAT configuration acquisition service setup answer. Further, the secondary RAT configuration acquisition service setup answer may include a request code to the request of the cellular entity, PLMN ID, eNB ID, cell ID, and a location and coverage of the eNB. The secondary RAT configuration acquisition service setup answer may be transmitted through a newly defined cellular system interface between the AP server and the cellular entity. A Command-Code value for identifying the secondary RAT configuration acquisition service setup answer may be defined. The Command-Code value may be allocated by IANA in IETF RFC 5516.

AP information on a minimum unit of a request included in the secondary RAT configuration acquisition service setup answer may include a MAC address (BSSID) of the AP, SSID of the AP, information (CSG and password/OSG) on whether the AP is AP in which only a limited user can use, HESSID of the AP, information (operating class, channel number) on a frequency channel in which the AP uses, and a location of the AP.

The result code included in the secondary RAT configuration acquisition service setup answer may be set to one of 'success', 'failure 1', and 'failure 2'. A result code set to 'success' represents that a request of the cellular entity was succeeded. A result code set to 'failure 1' represents that a request of the cellular entity was failed. A result code set to 'failure 2' represents that the request of the cellular entity may not be satisfied at a time point that receives a request of the cellular entity, but may be satisfied later. When the result code is set to 'failure 2', the AP server may further include a time point that responds a request of the cellular entity in the secondary RAT configuration acquisition service setup answer. Alternatively, the AP server may notify the cellular entity that the AP server may respond at a time point that may respond to a request of the cellular entity or may transmit corresponding AP information at a time point that may respond to the request of the cellular entity.

Upon receiving the secondary RAT configuration acquisition service setup answer from the AP server, the cellular entity determines a result code within the secondary RAT configuration acquisition service setup answer. When the result code is 'success', the cellular entity stores received AP information on a minimum unit of a request. When the result code is 'failure 1', the cellular entity no longer requests AP information. When the result code is 'failure 2', the cellular entity awaits until a time point, at which the AP server can respond to a request of the cellular entity, included in the secondary RAT configuration acquisition service setup answer. The cellular entity may request again later AP information at a time point at which the AP server can respond to the request of the cellular entity.

Hereinafter, a method in which an entity of a secondary RAT system updates information of a primary RAT system through a secondary RAT connection with a general device and updates information thereof to a management device through a wired network of the secondary RAT system based on the acquired information of the primary RAT system according to an embodiment of the present invention is described. Information of the primary RAT system in which the entity of the secondary RAT system acquires may include an ID of an entity (e.g., a serving base station and an MME) of the primary RAT system, and location information using and location technology. Hereinafter, for convenience of the description, it is assumed that the primary RAT system is 3GPP LTE (or 3GPP LTE-A), which is a cellular system and the secondary RAT system is Wi-Fi, which is a WLAN system, and it is assumed that the entity of the secondary RAT system is an AP. The management device may be the above-described AP server. Further, the management device may be a device that provides ANDSF. Further, the general device may be a multi-RAT device that supports a plurality of RATs. In the following description, a general device and a multi RAT device may be mixed and used.

Figure 11:
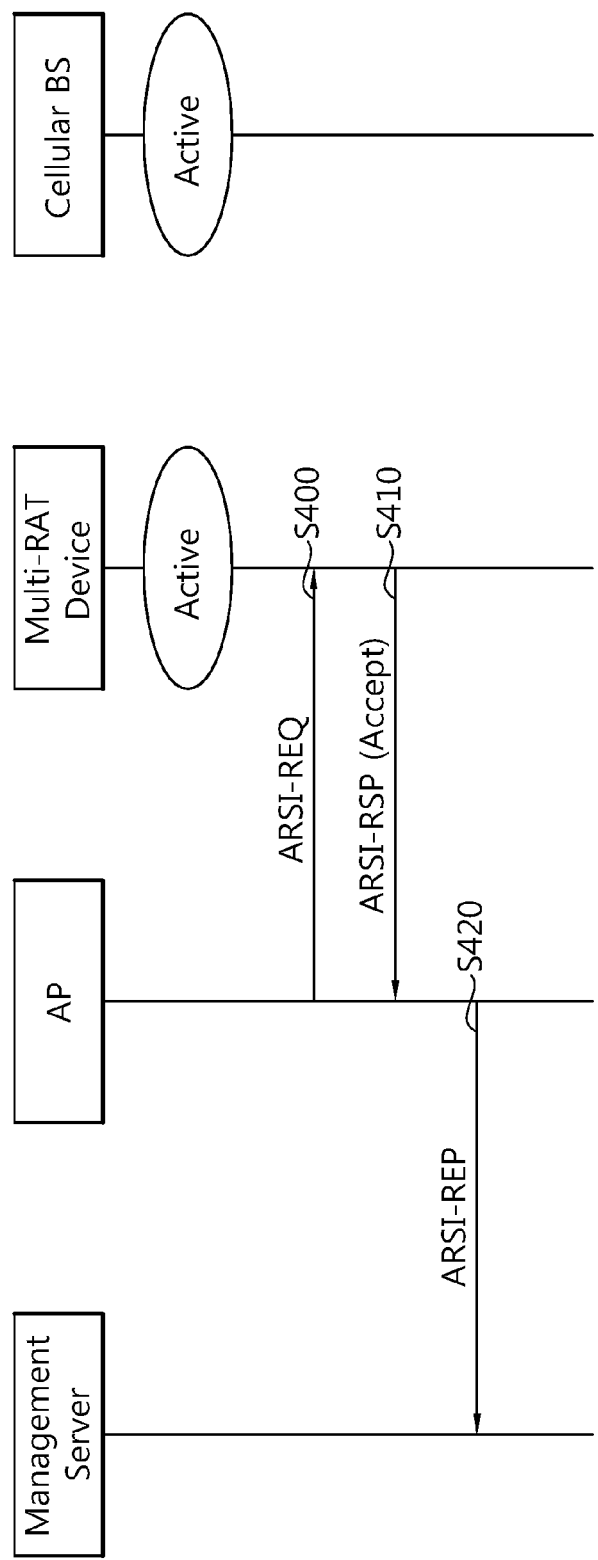
FIG. 11 is an example of a method of acquiring information on a cellular system using a multi-RAT device in an active state.

FIG. 11 is an example of a method of acquiring information on a cellular system using a multi-RAT device in an active state.

In step S400, an AP transmits an advanced primary RAT system information request (ARSI-REQ) frame to the multi-RAT device so that the information on the cellular system is requested to the multi-RAT device. The ARSI-REQ frame may have a format of a management MAC frame of an existing IEEE 802.11.

In step S410, the multi-RAT device transmits an advanced primary RAT system information response (ARSI-RSP) frame as a response to the ARSI-REQ frame to the AP through Wi-Fi wireless connection so that the information on the cellular system is transferred to the AP. The ARSI-RSP frame may have a format of a management MAC frame of an existing IEEE 802.11. The ARSI-RSP frame may include a result (accept/reject) for the request of the AP. It is assumed that the multi-RAT device accepts a request of the AP in FIG. 11.

In step S420, upon receiving the ARSI-RSP frame from the multi-RAT device, the AP transmits an advanced primary RAT system information report (ARSI-REP) frame to a management server so that the acquired information on the cellular system is transferred. When additional information is required, steps S100 to step S120 may be repeatedly performed.

Figure 12:
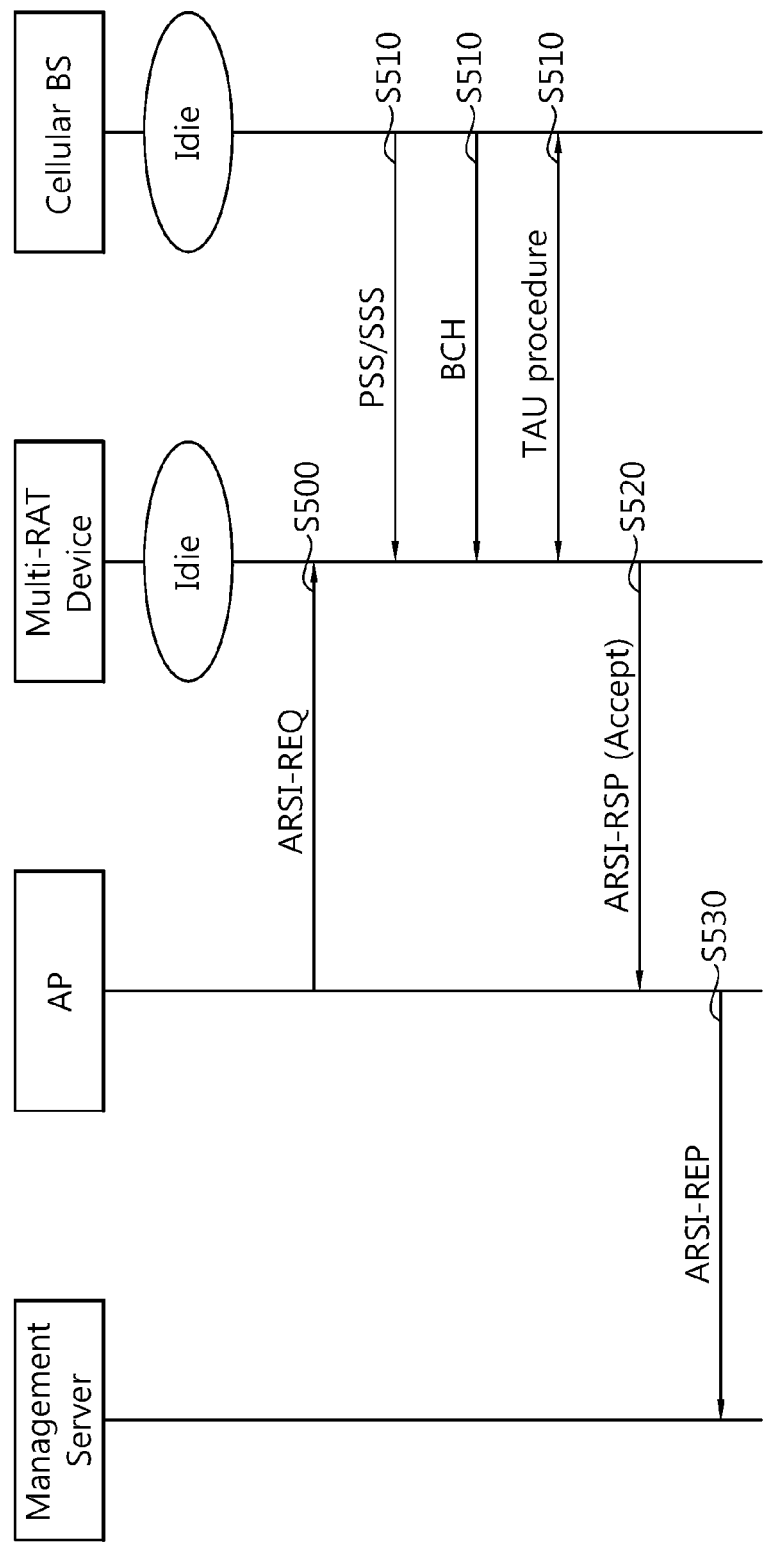
FIG. 12 is an example of a method of acquiring information on a cellular system using a multi-RAT device in an idle state.

FIG. 12 is an example of a method of acquiring information on a cellular system using a multi-RAT device in an idle state.

In step S500, an AP transmits an ARSI-REQ frame to the multi-RAT device so that the information on the cellular system is requested to the multi-RAT device. The ARSI-REQ frame may have a format of a management MAC frame of an existing IEEE 802.11. The AP may select at least one multi-RAT device from all multi-RAT devices which has Wi-Fi wireless connection with the AP. This is because a form of a hierarchical network must be considered.

In step S510, the multi-RAT device may receive a primary synchronization signal (PSS)/secondary synchronization signal (SSS) from the base station or a system information block (SIB) through a broadcast channel (BCH) in order to acquire information on the cellular system. The multi-RAT device may perform a TAU procedure with the base station.

In step S520, the multi-RAT device transmits an ARSI-RSP frame as a response to the ARSI-REQ frame to the AP through Wi-Fi wireless connection so that the information on the cellular system is transferred to the AP. The ARSI-RSP frame may have a format of a management MAC frame of an existing IEEE 802.11. The ARSI-RSP frame may include a result (accept/reject) for the request of the AP. It is assumed that the multi-RAT device accepts a request of the AP in FIG. 12. Further, it is assumed to approve that the cellular system and the multi-RAT device transfer information on the cellular system to other system.

In step S530, upon receiving the ARSI-RSP frame from the multi-RAT device, the AP transmits an ARSI-REP frame to a management server so that the acquired information on the cellular system is transferred. When additional information is required, steps S100 to step S120 may be repeatedly performed.

When describing a method in which an AP updates information of a primary RAT system using a general device according to an embodiment of the present invention, it is assumed that a multi RAT device, having received an ARSI-REQ frame transmitted from the AP, has already transmitted information of the primary RAT system to the AP.

In various situations, APs may update information of the primary RAT system. First, when information of the primary RAT system is changed, the AP may update information of the primary RAT system. For example, when information of the primary RAT system is changed, which is a very rare case, the AP may update information of the primary RAT system. That is, even if state of a Wi-Fi link between the AP and the general device is a predetermined level or more, but when at least one of information of the primary RAT system which the general device transmits to the AP is changed, the AP may update information of the primary RAT system. Changeable information of the primary RAT system may include a network identifier, a BS controller identifier, and a cell/BS identifier. As another example, when a cellular cell or a base station is changed as a general device moves, the AP may update information of the primary RAT system. That is, even if state of a Wi-Fi link between the AP and the general device is a predetermined level or more, but when the general device moves to another cellular cell or a base station, the AP may update information of the primary RAT system.

Alternatively, when other information instead of information of the primary RAT system is changed, the AP may update information of the primary RAT system. For example, when location information (e.g., a coordinate) of the general device is changed, the AP may update information of the primary RAT system. That is, even if state of a Wi-Fi link between the AP and the general device is a predetermined level or more, but if location information which the general device transmits to the AP deviates from a change range, the AP may update information of the primary RAT system. In this case, the cellular cell or the base station is not changed.

Alternatively, information of the primary RAT system is not updated, but when a device to transmit information of the primary RAT system to the AP should be changed, the AP may update information. For example, when the AP should acquire information of the primary RAT system using another general device as an existing general device moves, the AP may update information. That is, when state of a Wi-Fi link between the AP and the general device drops to less than a predetermined level (a situation in which the general device may deviate from coverage of the AP), the AP may update information.

When the AP requests information of the primary RAT system to the general device through the Wi-Fi link, the AP may notify the general device of an update configuration of the primary RAT system information. That is, update configuration of the primary RAT system information may be included in an ARSI-REQ frame. Update configuration of the primary RAT system information may include an update method of the primary RAT system information and/or a location change range of the general device. The location change range of the general device may be included only when the AP requests location information of the general device. For example, a location change range of the general device may be 50 m.

An update method may be divided into periodic transmission and event triggered transmission. In periodic transmission, the AP may transmit a parameter such as an update transmission cycle to a general device. Accordingly, the general device may periodically transmit information of the primary RAT system to the AP.

In event triggered transmission, only when an update condition is satisfied, the general device may transmit information of the primary RAT system to the AP. That is, as described above, when an update condition is satisfied such as when information of the primary RAT system is changed, when other information is changed, or when the device is changed, the general device may transmit information of the primary RAT system to the AP. In this case, an update method may be changed according to an action code. For example, an update method according to an action code may be as follows.

Action 1: Only when a state of the general device is an "active mode" in the primary RAT system, a corresponding information request is accepted.

Action 2: a corresponding information request is accepted regardless of a state of the general device in the primary RAT system.

Action 3: Identifier information of a network (e.g., PLMN) of the primary RAT system is requested.

Action 4: Identifier information of a BS controller (e.g., MME) of the primary RAT system is requested.

Action 5: Identifier information of a cell or a BS (including all kinds of BS such as a macro BS, a femto BS, and a pico BS) of the primary RAT system is requested.

Action 6: Location information (e.g., a coordinate) of a general device is requested.

As described above, upon receiving an ARSI-REQ frame, the general device transmits an ARSI-RSP frame to the AP (refer to step S410 of FIG. 11 and step S520 of FIG. 12). A frame body field of the ARSI-RSP frame may include a result parameter representing a result (accept/reject) of a request of the AP. Further, a frame body field of the ARSI-RSP frame may include a reason parameter representing a cause of a result of a request of the AP. When the result parameter is accept, the reason parameter may be omitted or may be set to a meaningless value. Therefore, when a result parameter is 'reject', the reason parameter may be generally included. For example, the reason parameter may be one of a case in which the general device cannot perform a request of the AP because a primary RAT system or a general device does not allow to transmit information of the primary RAT system to another system ('not support'), or a case in which a general device cannot perform a request of the AP because a state of the general device and the primary RAT system is not a suitable state such as an active mode ('not suitable').

Further, a frame body field of an ARSI-RSP frame may include an output parameter representing primary RAT system information corresponding to an action code according to a request of the AP and information on whether the output parameter is included. For example, when the action code is 3, the output parameter may include identifier information of a network (e.g., PLMN) of the primary RAT system. For example, when the action code is 4, the output parameter may include identifier information of a BS controller (e.g., a MME) of the primary RAT system. For example, when the action code is 5, the output parameter may include identifier information of a cell or a BS (including all kinds of BS such as a macro BS, a femto BS, and a pico BS) of the primary RAT system. For example, when the action code is 6, the output parameter may include location information (e.g., a coordinate) of a general device.

Meanwhile, upon receiving the ARSI-REQ frame including an update method according to an embodiment of the present invention, the general device transmits an unsolicited ARSI-RSP frame to the AP according to an update method. A frame body field of the unsolicited ARSI-RSP frame may include a result parameter representing a result (accept/reject) of a request of the AP. Further, a frame body field of the unsolicited ARSI-RSP frame may include a reason parameter representing a cause of a result of a request of the AP. When the result parameter is accept, the reason parameter may be omitted or may be set to a meaningless value. Therefore, when a result parameter is 'reject', a reason parameter may be generally included. For example, the reason parameter may be one a case in which a general device cannot perform a request of a AP because the primary RAT system or the general device does not allow to transmit information of the primary RAT system to another system ('not support'), or a case in which a general device cannot perform a request of a AP because a state between a general device and a primary RAT system is not a suitable state such as an active mode ('not suitable'), or a case in which a general device can no longer update information of a primary RAT system because state of a Wi-Fi link with the AP is dropped to less than a predetermined level ('not good').

Further, a frame body field of an unsolicited ARSI-RSP frame may include an output parameter representing primary RAT system information corresponding to an action code according to a request of the AP. The output parameter may include primary RAT system information corresponding to all action codes according to a request of the AP or only changed primary RAT system information. For example, when the action code is 3, the output parameter may include identifier information of a network (e.g., PLMN) of the primary RAT system. For example, when the action code is 4, the output parameter may include identifier information of a BS controller (e.g., the MME) of the primary RAT system.

For example, when the action code is 5, the output parameter may include identifier information of a cell or a BS (including all kinds of BS such as a macro BS, a femto BS, and a pico BS) of the primary RAT system. For example, when the action code is 6, the output parameter may include location information (e.g., a coordinate) of the general device. Only when a location of the general device deviates from a location change range, location information of the general device may be included.

Upon receiving the unsolicited ARSI-RSP frame, the AP may perform operation according to a result parameter included in the unsolicited ARSI-RSP frame. When a result parameter is 'reject', the AP may transmit again an ARSI-REQ frame. Such a case may correspond to a case in which a target device in which the AP requests information of the primary RAT system is changed. That is, a reason parameter included in the unsolicited ARSI-RSP frame may be 'not good'. In this case, the AP may transmit an ARSI-REQ frame to another general device instead of a general device which transmitted the unsolicited ARSI-RSP frame. Alternatively, even if the AP does not receive a unsolicited ARSI-RSP frame, when state of a Wi-Fi link with the general device which the AP measures is dropped to less than a predetermined level, the AP may transmit an ARSI-REQ frame to a new general device.

When a result parameter included in the unsolicited ARIS-RSP frame is 'accept', the AP compares a previously acquired output parameter and an output parameter newly received through the unsolicited ARSI-RSP frame, and only when two output parameters are different, the AP may transmit changed information of the primary RAT system to an AP information management device such as the AP server. This corresponds to step S420 of FIG. 11 and step S530 of FIG. 12. Such a case may correspond to a case in which information of the primary RAT system or other information is changed. In this case, when the AP may estimate a location thereof based on location information of the general device within the unsolicited ARSI-RSP frame, the AP may transmit also estimated location information thereof to the AP information management device. Further, the AP may transmit information thereof such as SSID/BSSID, information (CSG and password/OSG) on whether the AP is an AP in which only a limited user can use, HESSID, and information (operating class, channel number) of a using frequency channel to the AP information management device. As a new entity is added between the AP and the AP information management device, the new corresponding entity may collect information of the primary RAT system in which the AP transmits, and may transmit the collected information to the AP information management device by changing a transmission format. An added new entity may be a dual-stack gateway or an AP controller. The AP and the corresponding entity may previously know information (e.g., address) about the AP information management device or may acquire information (e.g., address) about the AP information management device through an authentication server by an authentication process. Upon receiving the ARSI-REP frame, the AP server stores and manages parameter information within the ARSI-REP frame.

Hereinafter, a method in which an AP information management entity within a cellular network acquires newest AP information from the AP server is described. This may be described additionally to a method in which an AP information management entity acquires AP information from the AP server according to an embodiment of the present invention, as described in FIGS. 6 to 10.

1) When the eNB, which is an AP information management entity, acquires AP information from the AP server through the MME according to an embodiment of FIGS. 6 and 7, a method of updating information of a secondary RAT system for the eNB, which is the AP information management entity, is described. When transmitting a secondary RAT information request or a secondary RAT configuration acquisition service setup request, the eNB or the MME may notify the AP server of an update configuration of AP information, i.e., an update method such as periodic transmission or event triggered transmission. The AP server transmits updated AP information to the eNB, which is an AP information management entity, according to an update method of AP information. When an update method is periodic transmission, even if AP information is not changed, the AP server periodically transmits entire AP information to the eNB, which is an AP information management entity, via the MME. When an update method is event triggered transmission, if changed AP information exists, the AP server transmits the changed AP information to the eNB, which is an AP information management entity, via the MME.

The AP server transmits an update message including AP information according to an update method to the MME. The update message may be a secondary RAT configuration acquisition service setup answer. The AP server may transmit an update message to a previously requested MME or to a new MME to which an eNB to which a corresponding AP moves belongs. Because the AP and the AP server can acquire information about a new MME through a general device, the AP server may transmit an update message to the changed MME. The update message may be transmitted through a newly defined cellular system interface between the AP server and the MME. A Command-Code value for identifying the update message may be defined. The Command-Code value may be allocated by IANA in IETF RFC 5516.

The update message may include an update flag. The update flag may exist per each AP. The update flag may include a parameter such as 'add', 'modify', 'no change', and 'delete'. 'Add' represents that new information of the AP is transmitted. 'Modify' represents that previously transmitted information of the AP is changed. 'No change' represents that information of the AP is the same as previously transmitted information of the AP. 'Delete' represents that previously transmitted information of the AP is no longer valid and should be thus deleted. Further, the update message may include AP information such as PLMN ID, eNB ID, cell ID, a location and coverage, a MAC address (BSSID) of the AP, SSID of the AP, information CSG and password/OSG) on whether the AP is an AP in which only a limited user can use (, HESSID of the AP, and information (operating class, channel number) about a frequency channel in which the AP uses and an AP location, in addition to the update flag.

Upon receiving the update message from the AP server, the MME transmits AP information corresponding to each eNB included in the update message to a corresponding eNB. The update message may be secondary RAT information request acknowledge. In this case, when a MME to which an eNB to which a corresponding AP moves belongs is different from a previous MME, the previous MME may transmit an update message to a new eNB through a new MME. The update message may be transmitted using a S1 application protocol.

The MME performs the following operation according to an update flag within the update message received from the AP server.

'Add': Information of an AP in which the update flag is 'add' is transmitted to an eNB having coverage overlapped with a corresponding AP. In this case, the MME may determine a PLMN ID and eNB ID of a corresponding AP received from the AP server and determine an eNB to transmit. The update message transmitted to the eNB includes an action code ('add') and AP information on a minimum unit of a request of each corresponding eNB.

'Modify': when changed AP information is transmitted to the same eNB as a previous eNB, an update message transmitted to the eNB includes an action code ('modify') and AP information on a minimum unit of a request. When the changed AP information is transmitted to an eNB different from a previous eNB, i.e., when an AP moves to another eNB, an update message transmitted to the previous eNB to which a corresponding AP belonged includes an action code ('delete') and AP information on a minimum unit of a request, and an update message transmitted to a new eNB to which a corresponding AP belongs includes an action code ('add') and AP information on a minimum unit of a request.

For example, for AP ID 1, it is assumed that previously received information is PLMN ID 1 and eNB ID 1 and recently received information is PLMN ID 1 and eNB ID 2. In this case, an update message including an action code ('delete') and AP information (e.g., only an AP identifier) may be transmitted to an eNB in which eNB ID is 1, and an update message including an action code ('add') and AP information (e.g., AP BSSID, SSID) may be transmitted to an eNB in which eNB ID is 2. Further, when the AP includes new different eNB ID/cell ID together with an existing eNB ID/cell ID, i.e., when the AP is overlapped in coverage of several base stations, an update message transmitted to a new eNB to which a corresponding AP belongs includes an action code ('add') and AP information on a minimum unit of a request.

'No change': The update message transmitted to the eNB does not include corresponding AP information.

'Delete': The update message transmitted to the eNB includes an action code ('delete') and AP information on a minimum unit of a request.

Upon receiving the update message from the MME, the eNB performs operation according to an action code within the update message. The eNB stores new information of the AP in which an action code is 'add'. The eNB may update information of an AP in which an action code is 'modify'. The eNB may delete information of an AP in which an action code is 'delete'.

When the AP server is located at the outside of a cellular system, AP information may be updated with the same method as the above-described method except that an update message transmitted from the AP server to the MME has a format of an IP packet. Alternatively, even when the AP server is located at the outside of a cellular system and the AP information management entity is an MME, AP information may be updated with the same method as the above-described method. That is, when the MME acquires AP information via a cellular node such as an S-GW and P-GW through an existing signaling path, AP information may be updated with the same method as the above-described method except that the update message transmitted from the AP server to the S-GW and P-GW has a format of an IP packet. However, the S-GW and the P-GW may perform operation in which the MME performs according to the update flag, and the MME may perform operation in which the eNB performs.

2) When the eNB, which is an AP information management entity, directly acquires AP information from the AP server according to an embodiment of FIGS. 8 and 9, a method of updating information of a secondary RAT system for the eNB, which is the AP information management entity, is be described. When the eNB transmits a secondary RAT configuration acquisition service setup request, the eNB may notify the AP server of an update configuration of AP information, i.e., an update method such as periodic transmission or event triggered transmission. The AP server transmits updated AP information to the eNB, which is an AP information management entity, according to an update method of AP information. When update method is periodic transmission, even if AP information is not changed, the AP server periodically transmits entire AP information to the eNB, which is an AP information management entity. When an update method is event triggered transmission, if changed AP information exists, the AP server transmits the changed AP information to the eNB, which is an AP information management entity.

The AP server transmits an update message to the eNB. The update message may be a secondary RAT configuration acquisition service setup answer. The update message may be transmitted through a newly defined cellular system interface between the AP server and the eNB. A Command-Code value for identifying the update message may be defined. The Command-Code value may be allocated by IANA in IETF RFC 5516.

The update message may include an update flag. The update flag may exist per each AP. The update flag may include a parameter such as 'add', 'modify', 'no change', and 'delete'. 'Add' represents that new information of the AP is transmitted. When eNB ID of the same AP is changed, i.e., when a corresponding AP moves to another eNB, an update flag of the corresponding AP within an update message transmitted to a new eNB to which a corresponding AP belongs is set to 'add'. 'Modify' represents that previously transmitted information of the AP is changed. When the changed AP information is transmitted to the same eNB as the previous eNB, an update flag of a corresponding AP within the update message transmitted to the eNB is set to 'modify'. 'No change' represents that information of the AP is the same as previously transmitted information of the AP. 'Delete' represents that previously transmitted information of the AP is no longer valid and should be thus deleted. When an eNB ID is changed for the same AP, i.e., when a corresponding AP moves to another eNB, an update flag of the corresponding AP within an update message transmitted to a previous eNB to which a corresponding AP belonged is set to 'delete'. Further, the update message may include AP information such as PLMN ID, eNB ID, cell ID, a location and coverage, a MAC address (BSSID) of the AP, SSID of the AP, information (CSG and password/OSG) on whether the AP is an AP in which only a limited user can use, HESSID of the AP, and information (operating class, channel number) about a frequency channel in which the AP uses and an AP location, in addition to the update flag. Because the update message is transmitted to a specific eNB, PLMN ID and eNB ID may be a ground that determines whether a corresponding update message is valid to the eNB. Alternatively, PLMN ID and eNB ID may be omitted. The eNB may update AP information according to the update flag.

When the AP server is located at the outside of a cellular system, and when the eNB, which is an AP information management entity, acquires AP information through a data path generated through the MME or acquires AP information using data path information of an already known general device, in order to acquire AP information, AP information may be updated with the same method as the above-described method except that the update message transmitted from the AP server to the eNB has a format of an IP packet.

3) When an MME or a new entity, which is an AP information management entity, acquires AP information from the AP server according to an embodiment of FIG. 10, a method of updating information of a secondary RAT system for the MME or the new entity, which is an AP information management entity, is described. When transmitting a secondary RAT configuration acquisition service setup request, the MME or the new entity may notify the AP server of an update configuration of AP information, i.e., an update method such as periodic transmission or event triggered transmission. The AP server transmits updated AP information to the MME or the new entity, which is an AP information management entity, according to an update method of AP information. When an update method is periodic transmission, even if AP information is not changed, the AP server periodically transmits entire AP information to the MME or the new entity, which is an AP information management entity. When an update method is event triggered transmission, if changed AP information exists, the AP server transmits the changed AP information to the MME or the new entity, which is an AP information management entity.

The AP server transmits an update message to the MME or the new entity. The update message may be a secondary RAT configuration acquisition service setup answer. The update message may be transmitted through a newly defined cellular system interface between the AP server and the MME or the new entity. A Command-Code value for identifying the update message may be defined. The Command-Code value may be allocated by IANA in IETF RFC 5516.

The update message may include an update flag. The update flag may exist on each AP basis. The update flag may include a parameter such as 'add', 'modify', 'no change', and 'delete'. 'Add' represents that new information of the AP is transmitted. 'Modify' represents that previously transmitted information of the AP is changed. 'No change' represents that information of the AP is the same as previously transmitted information of the AP. 'Delete' represents that previously transmitted information of the AP is no longer effective and should be thus deleted. Further, the update message may include AP information such as PLMN ID, eNB ID, cell ID, a location and coverage, a MAC address (BSSID) of the AP, SSID of the AP, information (CSG and password/OSG) on whether the AP is an AP in which only a limited user can use, HESSID of the AP, and information (operating class, channel number) about a frequency channel in which the AP uses and an AP location, in addition to the update flag. The MME or the new entity may update AP information according to the update flag.

When the AP server is located at the outside of a cellular system, and when the MME, which is an AP information management entity, generates a data path or newly defines a data path other than an existing signaling path and acquires AP information through the corresponding data path, AP information may be updated with the same method as the above-described method except that an update message transmitted from the AP server to the MME has a format of an IP packet.

Figure 13:
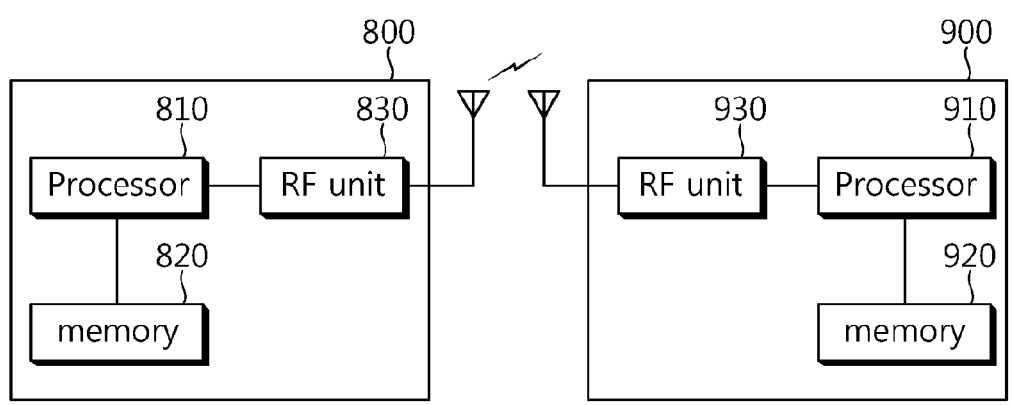
FIG. 13 is a block diagram showing wireless communication system to implement an embodiment of the present invention.

FIG. 13 is a block diagram showing wireless communication system to implement an embodiment of the present invention.

An AP server 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An eNB, MME, or new entity of a cellular system 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for updating, by an access point (AP), information on a cellular system in a wireless communication system, the method comprising:
    transmitting, to a first multi-radio access technology (RAT) device supporting a plurality of RATs, a request for information on a cellular system including an update configuration for the information on the cellular system;
    receiving, from the first multi-RAT device according to the update configuration, a response including an output for the request, wherein the output for the request includes location information of the first multi-RAT device when the location information of the first multi-RAT device is changed;
    if a link state between the AP and the first multi-RAT device is higher than or equal to a predetermined level and the first multi-RAT device deviates from a location change range of the first multi-RAT device,
    comparing the output for the request with a previously acquired output, and
    transmitting, to an AP information management device, updated information on the cellular system based on the response when the output for the request is different from the previously acquired output; and
    if a link state between the AP and the first multi-RAT device is lower than the predetermined level and the first multi-RAT device deviates from a coverage of the AP,
    transmitting, to a second multi-RAT device supporting the plurality of RATs, the request for the information on the cellular system.

2. The method of claim 1, wherein the update configuration is one of a periodic transmission or an event-triggered transmission.

3. The method of claim 2, wherein if the update configuration is the event-triggered transmission, the response is received when the information on the cellular system is changed, or when information on the first multi-RAT device is changed, or when the first multi-RAT device is changed.

4. The method of claim 1, wherein the request is transmitted through an advanced primary RAT system information request (ARSI-REQ) frame, and
    wherein the response is received through an advanced primary RAT system information response (ARSI-RSP) frame.

5. The method of claim 1, wherein the response further includes a result of the request and a reason for the result.

6. The method of claim 1, wherein the output for the request further includes an identity of the cellular system, an identity of a base station (BS) controller of the cellular system and an identity of a cell or BS of the cellular system when the information on the cellular system is changed.

7. The method of claim 1, wherein the AP information management device is one of a generic advertisement service (GAS) server using an access network query protocol (ANQP) or a WLAN access gateway (WAG).

8. The method of claim 1, wherein the updated information on the cellular system further includes at least one of an estimated location of the AP, a media access control (MAC) address of the AP, a service set identifier (SSID) of the AP, a homogeneous extended service set ID (HESSID) of the AP, information on whether the AP can be used by a limited user, and information on a frequency channel used by the AP.

9. An access point (AP) for updating information on a cellular system in a wireless communication system, the AP comprising:
    a radio frequency (RF) unit that transmits or receives a radio signal; and
    a processor connected to the RF unit, and configured to:
        transmit, to a first multi-radio access technology (RAT) device supporting a plurality of RATs, a request for information on a cellular system including an update configuration for the information on the cellular system, receive, from the first multi-RAT device according to the update configuration, a response including an output for the request, wherein the output for the request includes location information of the first multi-RAT device when the location information of the first multi-RAT device is changed, if a link state between the AP and the first multi-RAT device is higher than or equal to a predetermined level and the first multi-RAT device deviates from a location change range of the first multi-RAT device, compare the output for the request with a previously acquired output, and transmit, to an AP infoimation management device, updated information on the cellular system based on the response when the output for the request is different from the previously acquired output, and if a link state between the AP and the first multi-RAT device is lower than the predetermined level and the first multi-RAT device deviates from a coverage of the AP, transmit, to a second multi-RAT device supporting the plurality of RATs, the request for the information on the cellular system.

* * * * *